(12) United States Patent
Kobayashi

(10) Patent No.: US 9,764,389 B2
(45) Date of Patent: Sep. 19, 2017

(54) CUTTING TOOL (75) Inventor: Youji Kobayashi, Satsumasendai (JP)

(73) Assignee: Kyocera Corporation, Kyoto (JP)

( * ) Notice: Subject to any disclaimer, the term of this patent is extended or adjusted under 35 U.S.C. 154(b) by 539 days.

(21) Appl. No.: 13/985,846

(22) PCT Filed: Feb. 15, 2012

(86) PCT No.: PCT/JP2012/053541
§ 371 (c)(1),
(2), (4) Date: Feb. 27, 2014

(87) PCT Pub. No.: WO2012/111710
PCT Pub. Date: Aug. 23, 2012

(65) Prior Publication Data
US 2014/0161549 A1 Jun. 12, 2014

(30) Foreign Application Priority Data
Feb. 15, 2011 (JP) ................. 2011-029822

(51) Int. Cl.
B23B 29/04 (2006.01)
B23B 27/16 (2006.01)
B23B 31/00 (2006.01)
B23B 27/00 (2006.01)
B23B 27/14 (2006.01)

(52) U.S. Cl.
CPC .......... *B23B 27/16* (2013.01); *B23B 27/007* (2013.01); *B23B 27/14* (2013.01); *B23B 29/04* (2013.01); *B23B 31/005* (2013.01); *B23B 2200/283* (2013.01); *B23B 2231/0244* (2013.01); *B23B 2231/0256* (2013.01); *Y10T 407/2268* (2015.01)

(58) Field of Classification Search
CPC ....... B23B 27/16; B23B 27/007; B23B 27/14; B23B 29/04; B23B 31/005; B23B 2200/283; B23B 2231/0244; B23B 2231/0256; B23B 29/02; Y10T 407/2268
See application file for complete search history.

(56) References Cited

U.S. PATENT DOCUMENTS 5,848,862 A * 12/1998 Antoun ................. B23B 27/007
407/103
2010/0067992 A1 3/2010 Uchijo et al.

FOREIGN PATENT DOCUMENTS

CN 101912987 A 12/2010
DE 2713529 A1 * 9/1978 ........... B23B 27/007
(Continued)

OTHER PUBLICATIONS

English translation of DE 102004053511 A1, Jul. 2005.*
(Continued)

*Primary Examiner* — Sunil K Singh
*Assistant Examiner* — Alan Snyder
(74) *Attorney, Agent, or Firm* — Viering, Jentschura & Partner mbB (57) ABSTRACT A cutting tool including an insert and a holder to which the insert is secured. The insert has a rod with a substantially circular transverse cross-section. The insert includes a shank portion and a cutting edge portion. The cutting edge portion is located at an end portion continuous with the shank portion. In the cutting edge portion, one end of a cutting edge ridge protrudes toward the periphery of the rod. When the insert is secured to the holder, the cutting edge ridge has a negative radial rake angle.

9 Claims, 6 Drawing Sheets (56) References Cited

FOREIGN PATENT DOCUMENTS

| JP | S62117003 U | 7/1987 | | |
|----|----|----|----|----|
| JP | 2000-271805 | 10/2000 | | |
| JP | DE 102004053511 A1 * | 7/2005 | ........... | B23B 27/007 |
| JP | 2009-034819 | 2/2009 | | |
| JP | WO 2011001873 A1 * | 1/2011 | ........... | B23B 27/007 |
| WO | 2008053633 | 5/2008 | | |

OTHER PUBLICATIONS

KYOCERA Corporation, 2007 KYOCERA Culling Tools, Japan, 2007, F26-F27, 2 pages.
Decision of Refusal of JP2012-557995 mailed on Sep. 9, 2014, with Concise Explanation thereof, 4 pages.
Concise Explanation of Reference 4 (JPS62117003U), 1 page.
English translation of the International Search Report issued in PCT/JP2012/053541 dated Mar. 13, 2012.
Office Action issued for Chinese application No. 201280004705.X on Nov. 27, 2014 together with the English translation thereof.
Concise explanation of reference CN 101912987A (one page).

* cited by examiner

CUTTING TOOL

CROSS-REFERENCE TO RELATED APPLICATIONS

This application is a national phase of the international application PCT/JP2012/053541 filed Feb. 15, 2012 that claims priority from the Japanese patent application JP2011-029822 filed on Feb. 15, 2011. The content of these aforementioned documents is herewith incorporated by reference in their entirety.

TECHNICAL FIELD OF THE INVENTION

The present invention relates to a cutting tool used with an insert mounted in a holder.

BACKGROUND OF THE INVENTION

As a cutting tool used for inside diameter boring or grooving, there has been conventionally known a cutting tool in which a rod-like insert having a cutting edge portion (hereinafter simply referred to as an insert) is inserted into a hole of a holder and secured by tightening bolts.

For example, Patent Literature 1 discloses that by inserting a rear end of a rod-like insert having a cutting edge portion at a front end thereof into a hole of a holder followed by adjusting the position of the cutting edge portion, the insert is prevented from being chipped off during mounting of the holder.

The following is a list of the aforementioned background art

Patent Literature 1: Japanese Unexamined Patent Application Publication No. 2000-271805

However, with the rod-like insert disclosed in Japanese Patent Application Publication No. 2007-271805, chip evacuation performance tends to deteriorate as the machining diameter decreases. As a result, for example, the cutting edge portion is chipped off by biting chips during machining.

An object of the present invention is to provide a cutting tool that provides good chip evacuation performance.

SUMMARY OF THE INVENTION

A cutting tool according to the present invention includes an insert in the shape of a rod with a substantially circular transverse cross-section, the insert including a shank portion and a cutting edge portion at an end portion continuous with the shank portion, the cutting edge having a cutting edge ridge protruding at one end thereof toward the periphery of the rod; and a holder to which the insert is secured. When the insert is secured to the holder, the cutting edge ridge has a negative radial rake angle.

In the cutting tool according to the present invention, since chips are produced more toward the rear of the insert by the cutting edge ridge having a negative radial rake angle, chip evacuation performance of the cutting tool is improved.

DETAILED DESCRIPTION OF THE DRAWINGS

Figure 1:
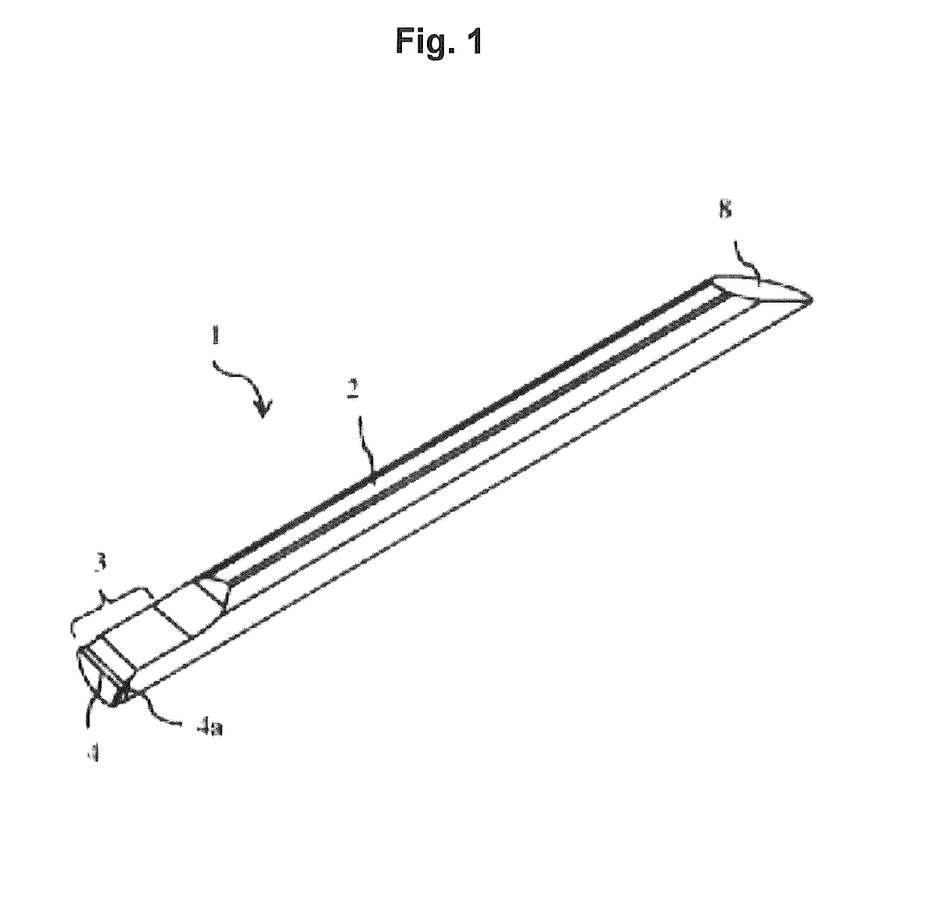
FIG. 1 is a perspective view of an insert of an embodiment for use in a cutting tool according to the present invention.
Figure 2A:
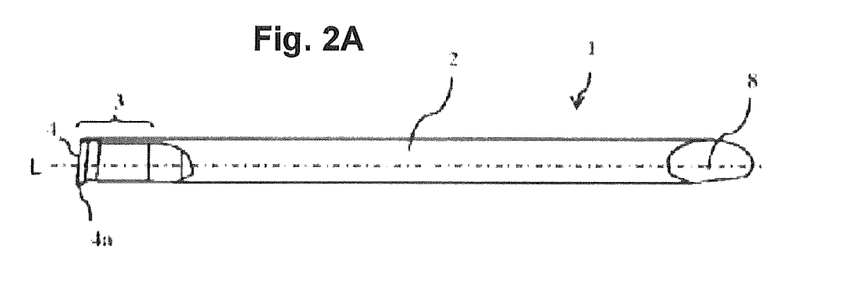
FIG. 2A is a top view of the insert of FIG. 1.
Figure 2B:
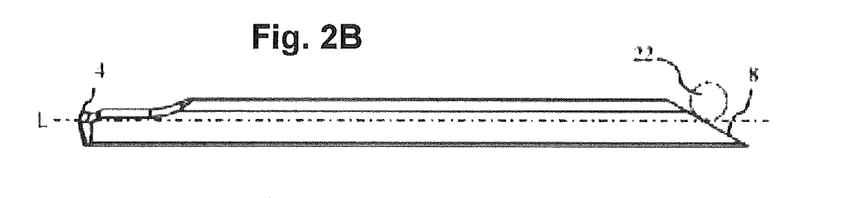
FIG. 2B is a side view of the insert of FIG. 1.
Figure 2C:
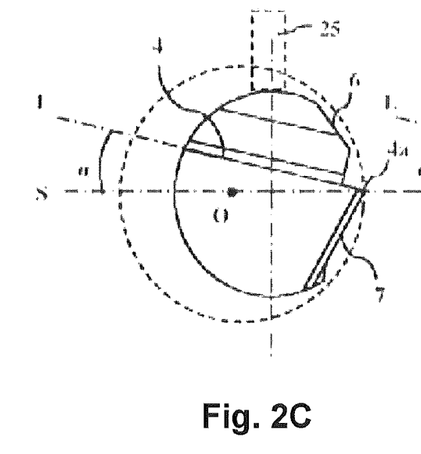
FIG. 2C is a front end view of the insert of FIG. 1.
Figure 2D:
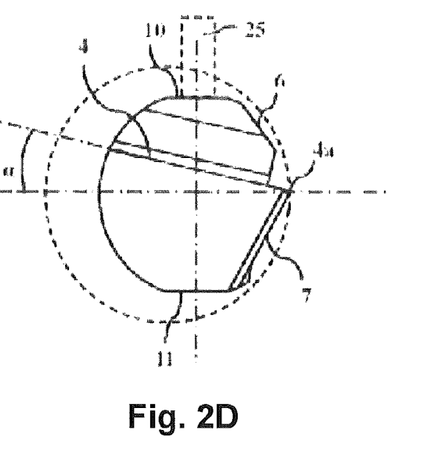
FIG. 2D is a front end view of the insert according to an embodiment of the present invention.
Figure 3A:
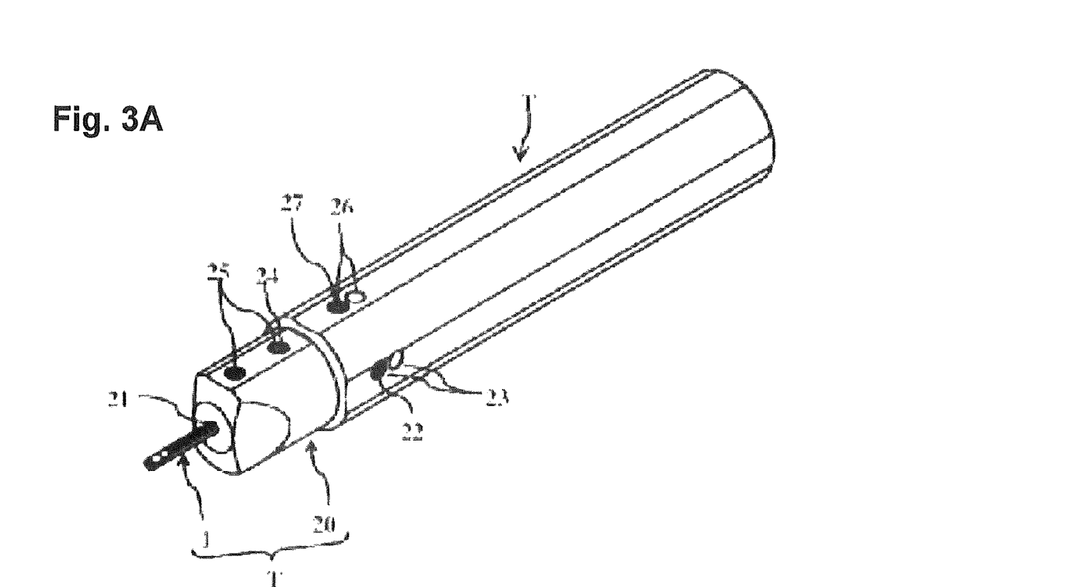
FIG. 3A is a perspective view of a holder with an insert of FIG. 1 therein according to an embodiment of the present invention.
Figure 3B:
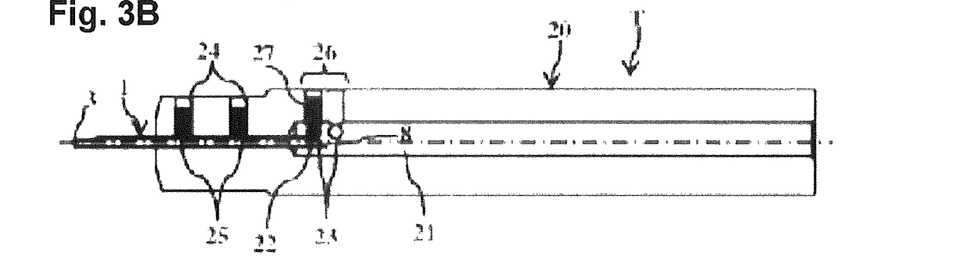
FIG. 3B is a side view of the cutting tool of FIG. 3A.

With reference to FIGS. 1 to 3B, a cutting tool T for boring will be described, which is an embodiment of a cutting tool of the present invention and is used with an insert 1 mounted in a holder 20. FIG. 1 is a perspective view of the insert 1. FIG. 2A is a top view of the insert 1 of FIG. 1. FIG. 2B is a side view of the insert 1, FIG. 2C is a front end view of the insert 1 as viewed from its front end which is an end portion where there is a cutting edge ridge, and FIG. 2D is a front end view of the insert 1 according to an embodiment. FIG. 3A is a perspective view of a holder with an insert of FIG. 1 therein according to an embodiment of the present invention, and FIG. 3B is a side view of the cutting tool of FIG. 3A.

Referring to FIG. 1, the insert 1 is in the shape of a rod with a substantially circular transverse cross-section, and a shank portion 2 and a cutting edge portion 3 at an end portion continuous with the shank portion 2 are formed, and a corner 4a on the periphery side of a cutting edge ridge 4 in cutting edge portion protrudes toward the periphery of the rod.

As illustrated in FIGS. 3A and 3B, on the other hand, the holder 20 of elongated shape is provided with a long insertion hole 21, which allows insertion of the insert 1 from a front end of the holder 20, and the insertion hole 21 is provided with a positioning member 22, which comes into contact with an inclined surface 8 of the insert 1, therein.

Figure 4A:
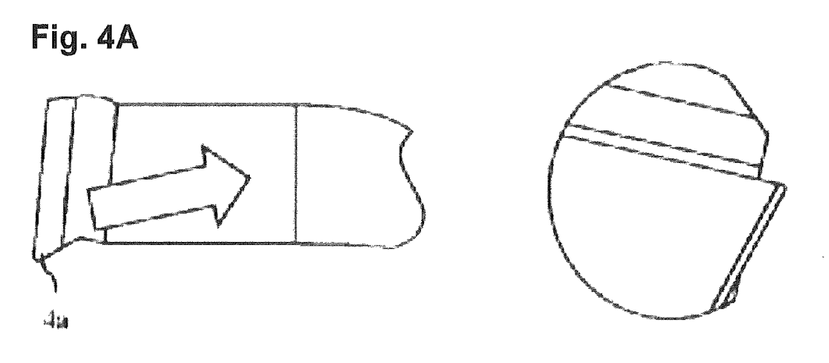
FIG. 4A is a diagram illustrating a flow of chips when a workpiece is cut with the cutting tool having a negative radial rake angle according to an embodiment of the present invention.
Figure 4B:
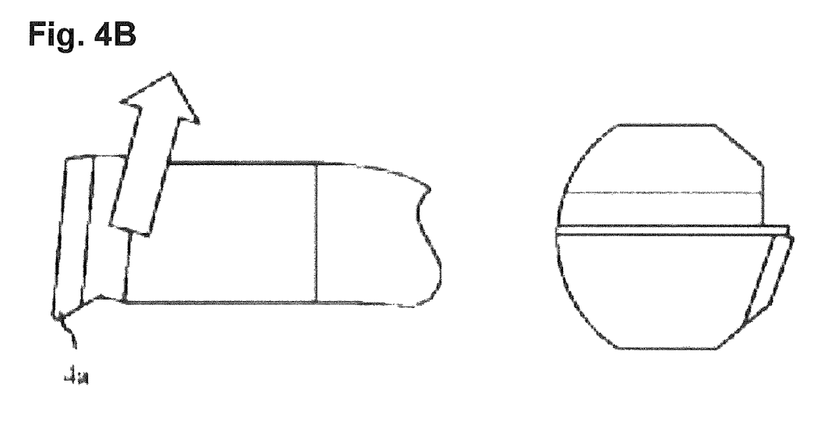
FIG. 4B is a diagram illustrating a flow of chips when a workpiece is cut with the cutting tool having a radial rake angle equal to zero.

Referring to FIGS. 1 through 2D, when the insert 1 is inserted into the insertion hole 21 of the holder 20 from an end opposite the end portion having the cutting edge portion 3 and is secured to the holder 20, the cutting edge ridge 4 has a negative radial rake angle α as illustrated in FIG. 2C. FIGS. 4A and 4B are diagrams illustrating a flow of chips when a workpiece has cut with a negative radial rake angle and zero radial rake angle, respectively. As is apparent from FIGS. 4A and 4B, an arrow indicating a direction in which chips are produced is directed more toward the rear of the insert in the structure of FIG. 4A, in which the cutting edge ridge 4 has a negative radial rake angle α as in the structure of FIGS. 1 through 2D, than that in the structure of FIG. 4B in which the radial rake angle α of the cutting edge ridge 4 is zero. Therefore, FIG. 4A provides better chip evacuation performance.

Note that the radial rake angle α refers to an angle formed by a reference plane S, which is a straight line passing through a cutting point at which the corner 4a of the cutting edge ridge 4 contacts the workpiece and a center O of a circular machining cross-section (machining path), and a straight line L parallel to the cutting edge ridge 4 illustrated in FIG. 2C in the front end view of the insert 1. The negative radial rake angle α preferably ranges from 5° to 20° when chip processability and cutting resistance are taken into account. That is, if the negative radial rake angle α is 5° or greater, better chip processability is achieved, and if the negative radial rake angle α is 20° or less, the rake angle at the corner 4a is not too negative and thus the cutting resistance at the corner 4a is not too high.

In a cutting operation using the insert 1, the machining path is circular as indicated by a dotted line in FIG. 2C, and corner 4a protruding on the periphery side of the cutting edge ridge 4 is set such that it is positioned immediately beside the machining path (a position which is at the same height as the center of the circular machining path). Therefore, in the front end view of the insert 1, the cutting edge ridge 4 is present above a semicircle of the insert 1 in transverse cross-section, that is, above the center of the insert. Thus, it is possible to improve rigidity of the cutting edge portion 3 of the insert 1, reduce deflection of the insert 1 during cutting, and reduce chattering of the insert 1.

In the front end view of the insert 1, a first taper (first cut surface) 6 is preferably formed above the corner 4a protruding on the periphery side of the cutting edge ridge 4, that is, above the cutting edge ridge 4. When the first taper 6 is elongated to the rear of the insert 1 having a rod-like shape, the overhang length of the insert 1 can be changed freely.

Figure 7:
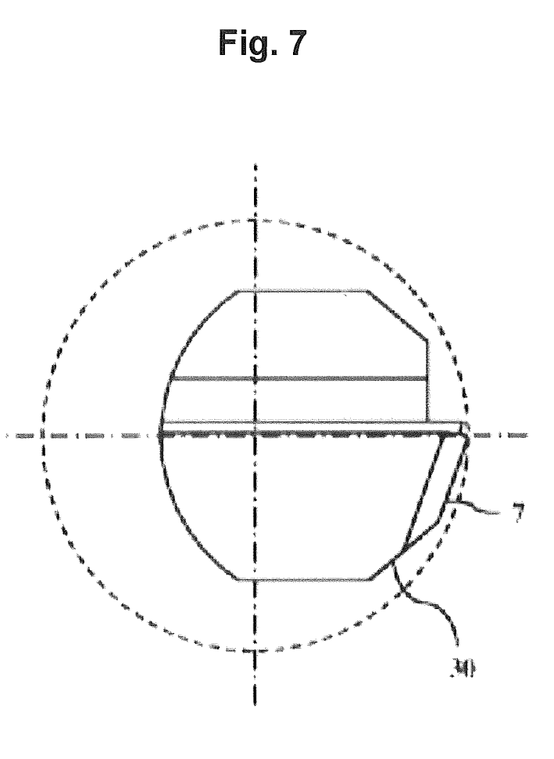
FIG. 7 is a front end view of an embodiment of a conventional insert.

In the front end view of the insert 1, there is only a second taper (side relief surface) 7 below the corner 4a of the cutting edge ridge 4, and no taper other than the second taper is present below the corner 4a. Conventionally, as illustrated in FIG. 7, it has been necessary to form a lower cut surface 30 in addition to the second taper 7, but the cutting edge portion 3 does not require the cut surface 30 with the structure illustrated in FIGS. 1 and 2, because it is possible to reduce interference of the lower part of the cutting edge portion 3 below the cutting edge ridge 4 with the workpiece. This eliminates the step of machining the lower cut surface 30 and reduces the cost. In the structure illustrated in FIGS. 1 and 2, the second taper 7 extends rearward to the shank portion 2.

Furthermore, as illustrated in FIGS. 3A and 3B, the inclined surface 8 is formed at the end portion opposite that having the cutting edge portion 3. The insert 1 is inserted from the inclined surface 8 side into the insertion hole 21 of the holder 20, and secured such that the inclined surface 8 is in line contact with the positioning member 22 in the holder 20. This structure facilitates high-precision positioning of the cutting edge of the insert 1 in the longitudinal and rotational directions.

In FIGS. 3A and 3B, a side surface of the holder 20 is provided with a plurality of positioning-member mounting holes 23 for insertion of the positioning member 22 having a rod-like shape. The rod-like positioning member 22 is inserted into one of the positioning-member mounting holes 23. The reason for providing the many positioning-member mounting holes 23 is to provide a structure that can appropriately adjust the overhang length of the insert 1. The positioning member 22 may be a pin, a screw member, or anything that comes into contact with the inclined surface 8 of the insert 1. For example, the positioning member 22 may be a rod-like member in the shape of a cylinder or a polygonal prism such as a triangular prism, and is not limited thereto. With a pin, which can be easily inserted and removed, the overhang length of the insert 1 can be changed easily. In the present embodiment, a pin is used as the positioning member 22. The positioning member 22 is positioned such that an axis of the positioning member 22 is perpendicular to the longitudinal direction of the insertion hole 21.

A method of securing the positioning member 22 may be securing method of sandwiching it between screws on both sides thereof, securing method of threading one end of the cylindrical pin and screwing this threaded part into a threaded part with which the holder 20 is provided, securing method of forming the cylindrical pin into a tapered shape having a greater diameter at one end and bringing the tapered part into contact with a predetermined portion in the positioning-member mounting hole 23, securing method of securing it with an adhesive, or securing method of fastening the side surface of the cylindrical pin with a screw member. In FIGS. 3A and 3B, adopted is a securing method in which a cylindrical pin (positioning member 22) is inserted into the positioning-member mounting hole 23 located in the side surface of the holder 20, a screw hole 26 is formed in an upper surface of the holder 20, and the screw member 27 is fastened to this to be in contact with the positioning member 22.

The position of the positioning member 22 in the insertion hole may be appropriately adjusted in accordance with the insertion angle of the inclined surface 8 of the insert 1. The inclined surface 8 of the insert 1 is brought into line contact with the positioning member 22. For example, when the positioning member 22 is a cylindrical pin and the insert 1 is mounted in the holder 20, a direction perpendicular to the longitudinal direction of the inclined surface 8 is parallel to a direction of the periphery of the positioning member 22 perpendicular to the longitudinal direction of the holder 20. This makes it possible to realize stable and firm restraint.

Referring to FIGS. 3A and 3B, to reduce falling and looseness of the insert 1, the holder 20 is provided with not only the positioning member 22, but also screw holes 24 which is formed at a location closer to the front end (first end) side of the holder 20 than the positioning member 22 is, and which penetrates the holder 20 from the periphery thereof to the insertion hole 21, the screw members 25 are screwed into the respective screw holes 24, so that the periphery of the shank portion 2 of the insert 1 is pressed and secured by the front ends of the screw members 25. The periphery of the shank portion 2 contacted by the screw members 25 may be a curved surface. That is, when the shank portion 2 is contacted on its curved surface by the screw members 25, since the insert 1 is not rotated during mounting by the effect of variations in manufacture, the insert 1 can be mounted with high positioning accuracy. Alternatively, when the periphery of the shank portion 2 contacted by the screw members 25 is a flat surface, if the clearance of the screw members 25 screwed into the holder is 10 to 30', the flat end faces of the screw members 25 are brought into surface contact with the flat periphery of the shank and secured. When secured by surface contact, the screw members 25 provide a greater restraining force.

Although the structure for positioning the insert 1 using the inclined surface 8 has described with FIGS. 1 and 2, the present invention is not limited to this, and, as illustrated in FIG. 2D of a front end view of another embodiment of the cutting tool of the present invention, an upper flat surface (second cut surface) 10 may be formed on the side opposite the corner 4a protruding on the periphery side of the cutting edge ridge 4 continuous with the first taper 6, that is, on the side opposite the cutting edge ridge 4 continuous with the first taper 6, so that the insert 1 may be positioned and secured by bringing the screw members 25 into contact with the upper flat surface 10. In this case, a lower flat surface 11 may be formed on the side opposite the upper flat surface 10, but the lower flat surface 11 does not necessarily have to be formed.

Figure 5:
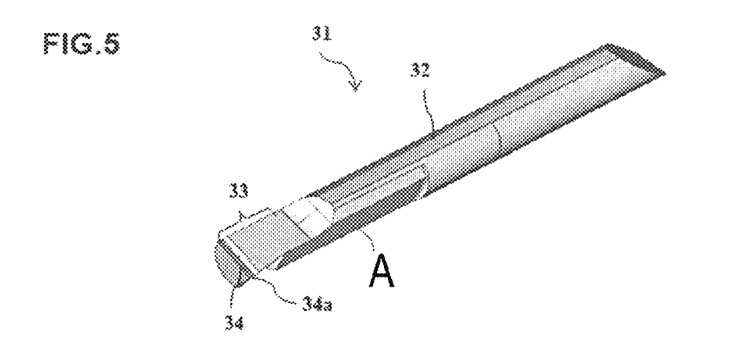
FIG. 5 is a perspective view of the insert of another embodiment for use in the cutting tool according to the present invention.
Figure 6A:
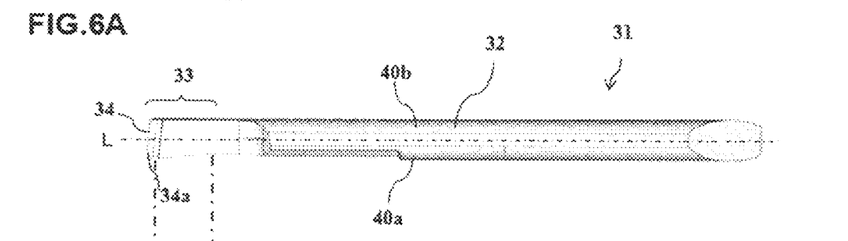
FIG. 6A is a top view of the insert of FIG. 5.
Figure 6B:
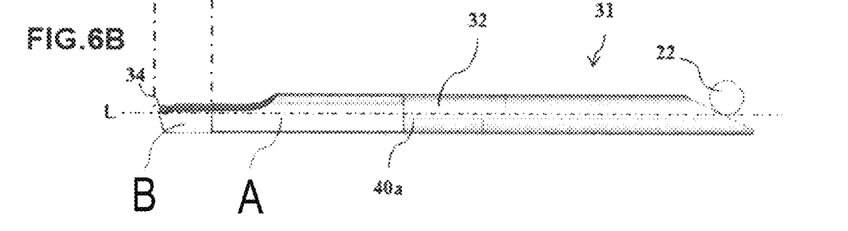
FIG. 6B is a side view of the insert of FIG. 5.
Figure 6C:
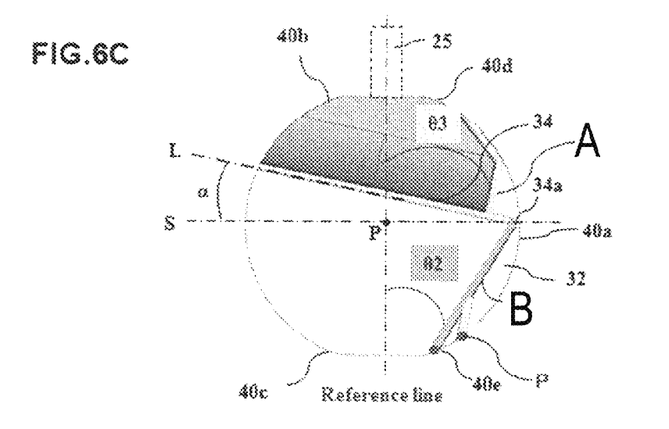
FIG. 6C is a front end view of the insert of FIG. 5.

Although FIGS. 1 through 2D illustrate the structure where the second taper 7 extends rearward to the shank portion 2, the present invention is not limited to this, and a structure illustrated in FIGS. 5 through 6C is also applicable. That is, in an insert 31 illustrated in FIGS. 5 through 6C, a second taper 37 of a cutting edge portion 33 does not extend to a shank portion 32 in the rear, and as viewed from the front end of the insert 31, the shank portion 32 protrudes toward one end 34a of a cutting edge ridge 34 with respect to the cutting edge portion 33 (or from the second taper 37 in FIGS. 6A to 6C). In the structure of FIG. 6, the shank portion 32 includes, corresponding to the insertion hole 21 of the holder 20, a curve extending from a point 40b to a point 40c and a curve including a point 40a and extending from a point 40d to the point 40e. The insert 31 is secured at three or more securing points included in the two curves and surrounding a center P of the insertion hole 21. Thus, when the shank portion 32 of the insert 31 is inserted into the insertion hole 21 of the holder 20, the insert 31 is prevented from loosening or deflecting, and it is possible to reduce twisting of the insert 31 and the resulting change in position of the cutting edge ridge 34.

REFERENCE SIGNS LIST 1, 31: insert
2, 32: shank portion
3, 33: cutting edge portion
4, 34: cutting edge ridge
4a, 34a: corner
6: first taper (first cut surface)
7, 37: second taper (side relief surface)
8: inclined surface
10: upper flat surface (second cut surface)
11: second taper (third cut surface)
20: holder
21: insertion hole
22: positioning member
23: positioning-member mounting hole
24, 26: screw hole
25, 27: screw member
30: lower cut surface
40 (40a to 40e): point
T: cutting tool
α: radial rake angle
S: reference plane (a straight line passing through the cutting point at which the corner of the cutting edge ridge contacts the workpiece and a center of the circular machining cross-section (machining path))
L: straight line parallel to cutting edge ridge

The invention claimed is:
1. A cutting tool comprising:
an insert having a rod shape with a substantially circular transverse cross-section, the insert comprising:
a shank portion;
a cutting edge portion being continuous with the shank portion and comprising a cutting edge ridge that is located at a front end portion of the cutting edge portion, wherein one end of the cutting edge ridge extends toward a periphery of the insert;
an inclined surface at a rear end surface of the cutting insert;
a first taper located above the cutting edge ridge in the shank portion, as viewed from an end portion of the insert;
a second taper located below the cutting edge ridge as viewed from the end portion of the insert;
a third taper located below the cutting edge ridge as viewed from the end portion of the insert; and
a holder to which the insert is secured, the holder comprising:
an insertion hole in the holder, wherein the shank portion of the insert is inserted in the insertion hole; and
a positioning member which is located perpendicular to the longitudinal direction of the insertion hole;
wherein the cutting edge ridge has a negative radial rake angle,
wherein the inclined surface and the positioning member has a line contact, and
wherein an offset between a direction of the line contact, as viewed from a front end of the insert, and the cutting edge ridge defines the radial rake angle,
wherein the second taper is the sole taper that is below the cutting edge ridge in the cutting edge portion, as viewed from the front end portion of the insert,
wherein the third taper is the sole taper that is below the cutting edge ridge in a front end region of the shank portion, as viewed from the front end portion of the insert, and
wherein an inclination angle θ2 of the second taper is larger than an inclination angle θ3 of the third taper.

2. The cutting tool according to claim 1, wherein as viewed from an end portion of the insert, a tip ridge extending continuously from the cutting edge ridge is located above a center of the insert.

3. The cutting tool according to claim 1, further comprising, in the shank portion, as viewed from the end portion of the insert, an upper flat surface that is located on a side opposite the cutting edge ridge continuous with the first taper.

4. The cutting tool according to claim 1, wherein the radial rake angle ranges from 5° to 20°.

5. The cutting tool according to claim 1, wherein the shank portion of the insert is secured in an insertion hole of the holder at three or more securing points surrounding a center of the insertion hole.

6. The cutting tool according to claim 5, wherein as viewed from an end portion of the insert, the shank portion of the insert has a shape which protrudes from the cutting edge portion toward the one end of the cutting edge ridge.

7. The cutting tool according to claim 1, wherein the inclined surface is located so as to intersect a reference line where the reference line is the line passing the center of a cutting path of the cutting edge ridge and being perpendicular to the longitudinal direction of the insertion hole.

8. The cutting tool according to claim 1, wherein, as viewed from the front end of the insert, the cutting edge ridge extends above from a reference line and the direction of the line contact is located on the reference line where the reference line is the line passing the center of a cutting path of the cutting edge ridge and being perpendicular to the longitudinal direction of the insertion hole.

9. A cutting tool comprising:
an insert having a rod shape with a substantially circular transverse cross-section, the insert comprising:
- a shank portion;
- a cutting edge portion being continuous with the shank portion and comprising a cutting edge that is located at a front end portion of the cutting edge portion, wherein one end of the cutting edge extends toward a periphery of the insert;
- a first taper located above a ridge of the cutting edge in the shank portion, as viewed from an end portion of the insert;
- a second taper located below the cutting edge ridge as viewed from the end portion of the insert;
- a third taper located below the cutting edge ridge as viewed from the end portion of the insert; and a holder to which the insert is secured; wherein
the cutting edge has a negative radial rake angle,
wherein the second taper is the sole taper that is below the cutting edge ridge in the cutting edge portion as viewed from the front end portion of the insert,
wherein the third taper is the sole taper that is below the cutting edge ridge in a front end region of the shank portion, as viewed from the front end portion of the insert, and
wherein an inclination angle $\theta 2$ of the second taper is larger than an inclination angle $\theta 3$ of the third taper.

\* \* \* \* \*